United States Patent [19]

Chea, Jr. et al.

[11] Patent Number: 4,598,173
[45] Date of Patent: Jul. 1, 1986

[54] INTERFACE CIRCUIT FOR A SUBSCRIBER LINE CIRCUIT

[75] Inventors: Ramon C. W. Chea, Jr., Monroe; Kevin C. Keegan, Cromwell; Reddeppa N. Pothuri; Albert H. Lloyd, Jr., both of Shelton, all of Conn.

[73] Assignee: ITT Corporation, New York, N.Y.

[21] Appl. No.: 660,591

[22] Filed: Oct. 15, 1984

[51] Int. Cl.$^4$ .................... H04M 19/02; H04M 3/02
[52] U.S. Cl. ........................ 179/18 FA; 179/16 AA; 179/84 R
[58] Field of Search ........... 179/18 FA, 16 AA, 16 F, 179/70, 77, 99 LC, 18 HB, 84 R, 84 A, 51 AA

[56] References Cited

U.S. PATENT DOCUMENTS

| | | | |
|---|---|---|---|
| 4,220,826 | 9/1980 | Kiss | 179/51 AA |
| 4,306,118 | 12/1981 | Ciboulet et al. | 179/84 A |
| 4,341,928 | 7/1982 | Stanson et al. | 179/51 AA |
| 4,370,526 | 1/1983 | Schoofs et al. | 179/51 AA |
| 4,429,186 | 1/1984 | Gartner | 179/77 |
| 4,431,868 | 2/1984 | Bolus et al. | 179/18 FA |
| 4,456,991 | 6/1984 | Chea, Jr. et al. | 370/58 |
| 4,458,112 | 7/1984 | Svala | 179/18 FA |

Primary Examiner—Gene Z. Rubinson
Assistant Examiner—R. Vaas
Attorney, Agent, or Firm—Peter C. Van Der Sluys; Robert A. Hays

[57] ABSTRACT

An interface circuit for a subscriber line circuit employs a controllable amplifier including a switching converter. The switching converter includes a capacitor coupled across a two-wire subscriber line and supplies an auxiliary voltage to the line. The amplifier includes an input adder having an output coupled to the switching converter for controlling the magnitude of the auxiliary voltage with one input of the adder adapted to receive a feedback control signal which is developed by monitoring the voltage across the output. Another input to the adder receives line input signals for the line circuit. The amplifier is controlled in operation by an off hook detector which provides an output signal when the subscriber line goes off hook to cause the amplifier to operate and further includes ring control logic which is also coupled to the amplifier and activates the amplifier during the presence of a ring control signal. In this manner, the amplifier is operative only during an off hook condition of the line and during ringing generation. The amplifier, based on its structure in the line circuit, provides all basic line functions such as DC current, ringing, voice and remote metering signals.

10 Claims, 4 Drawing Figures

INTERFACE CIRCUIT FOR A SUBSCRIBER LINE CIRCUIT

BACKGROUND OF THE INVENTION

The present invention generally relates to telecommunications or telephone exchange line circuits and, in particular, relates to a circuit for reducing power dissipation and implementing the basic line drive functions.

With the advent of modern telecommunications systems, there has been many innovations in the design and fabrication of the line circuit. Essentially, a line circuit is employed to interface with each subscriber, whether it be a telephone subset or a PBX trunk interface. The primary functions of the line circuit are to enable the switching system to service each line to determine whether or not the line is on or off hook, whether to apply ringing to the line circuit as well as controlling the level of speech or data that is transmitted or received by the line circuit during a connection.

Due to these factors, a large switching system will, of course, have a large number of line circuits, Modern switching systems such as the ITT 1240 Digital Exchange employ improved types of switching elements and, further, utilize distributed control techniques. Such systems utilize a great deal of software programming to implement system functions. A major cost factor in such switching systems is the line circuit. The line circuit is an extremely important element of any switching system as it is the primary interface with the subscriber. It is apparent that, based on the large number of circuits employed, any reduction in power or any improvement in operation substantially enhances the performance of the entire system. As such, there exists many patents which relate to improved techniques and structures for implementing line circuit functions and in implementing such functions in the above noted type of system.

For example, reference is made to U.S. Pat. No. 4,315,106 issued on Feb. 9, 1982 entitled APPARATUS REGULATING CURRENT SUPPLY TO A TELEPHONE LINE SIGNAL OF THE TYPE EMPLOYED IN DIGITAL TELEPHONE SYSTEMS by R. C. W. Chea, Jr., and assigned to International Telephone and Telegraph Corporation, the assignee hereof. This patent describes a circuit for supplying a regulated loop current to a telephone line.

Also see U.S. Pat. No. 4,317,963 entitled SUBSCRIBER LINE INTERFACE CIRCUIT UTILIZING IMPEDANCE SYNTHESIZER AND SHARE VOLTAGE SOURCE FOR LOOP CURRENT REGULATION CONTROL issued on Mar. 2, 1982 to R. C. W. Chea, Jr. and assigned to the assignee hereof. This patent describes a subscriber line interface circuit where current is supplied to a subscriber line from a shared voltage source such as a DC/DC converter that is regulated to permit a regulated line current to be supplied to many lines from the shared voltage source.

Other patents relating to such improvement are U.S. Pat. No. 4,387,273 entitled SUBSCRIBER LINE INTERFACE CIRCUIT WITH IMPEDANCE SYNTHESIZER issued on June 7, 1983 to R. C. W. Chea, Jr. as well as U.S. Pat. No. 4,349,703 entitled PROGRAMMABLE RING SIGNAL GENERATOR issued on Sept. 14, 1982 to R. C. W. Chea, Jr., both of which are assigned to the assignee hereof.

As one can ascertain, there has been a continuous effort to improve the operation of the line circuit in regard to many pertinent factors.

As indicated, the line circuit is expected to perform many basic line drive functions. Thus the line circuit, apart from supplying talk battery, must be capable of handling ringing signals, voice signals as well as remote metering and testing signals. The problem of ringing, for example, is a substantial problem based on present requirements primarily because the application of a ringing signal to a line circuit requires the use of high voltage commutating switches. Thus, the ringing signal in conventional circuits requires components capable of withstanding high voltage. Such components are not easily integrated and constitute an expensive portion of the line circuit. These components include high voltage isolation transformers, optical couplers, high voltage transistors and other devices.

A major problem in regard to previous line circuits is the fact that the circuits dissipated power that was necessary for line supervision. As indicated, any reduction of power in a line circuit results in a substantial reduction of power in the overall system due to the large number of such circuits.

In addition, the line circuit must be extremely reliable based on the operating environment as well as being able to withstand various surges and transients such as lightning and so on. It has been a major object of work to date to devise a completely integrated line circuit. In this manner, once the basic design has been formulated, the entire line circuit would be integrated in an integrated circuit array which, based on known techniques, can be mass-produced at an extremely reasonable cost.

However, the above noted problems and requirements concerning the basic line driving functions has prevented a complete integration of the line circuit.

SUMMARY OF THE INVENTION

It is, therefore, one object of the present invention to provide an improved line circuit which line circuit employs a dual voltage source arrangement for line feed.

It is another object to provide an improved line circuit which utilizes a unique high voltage operational amplifier design to eliminate the need for employing high voltage integrated circuit technology.

It is a further object to provide an improved line circuit capable of handling all basic line driving functions.

BRIEF DESCRIPTION OF THE PREFERRED EMBODIMENT

A front end circuit structure for a subscriber line circuit interface for use in a telephone exchange, the line circuit having a two wire line (T,R) with each line coupled to a central office battery ($V_B$) via a separate feed resistor ($R_1$) including a controllable amplifier means including a switching converter, including, as an integral element thereof, a capacitor coupled across the two wire line and operative to supply an auxiliary voltage to the line, means coupled to the line to monitor voltage across the capacitors for providing a feedback control signal for the amplifier, an adder having an output coupled to the switching converter for controlling the auxiliary voltage across the capacitor, with a first input of the adder coupled to the feedback control signal and a second input adapted to receive input signals for the line circuit, off hook signal detector means operative to provide an output signal when the subscriber line goes off hook for controlling said amplifier means to cause the same to operate during the off hook condition, ring control means coupled to said amplifier and operative to detect the presence of a ring control signal as applied to the line for providing an output for controlling the amplifier means to cause it to provide the ring signal whereby the amplifier means, as controlled, is operative only during the presence of ringing and during an off hook condition of the subscriber line.

DETAILED DESCRIPTION OF THE INVENTION

Figure 1:
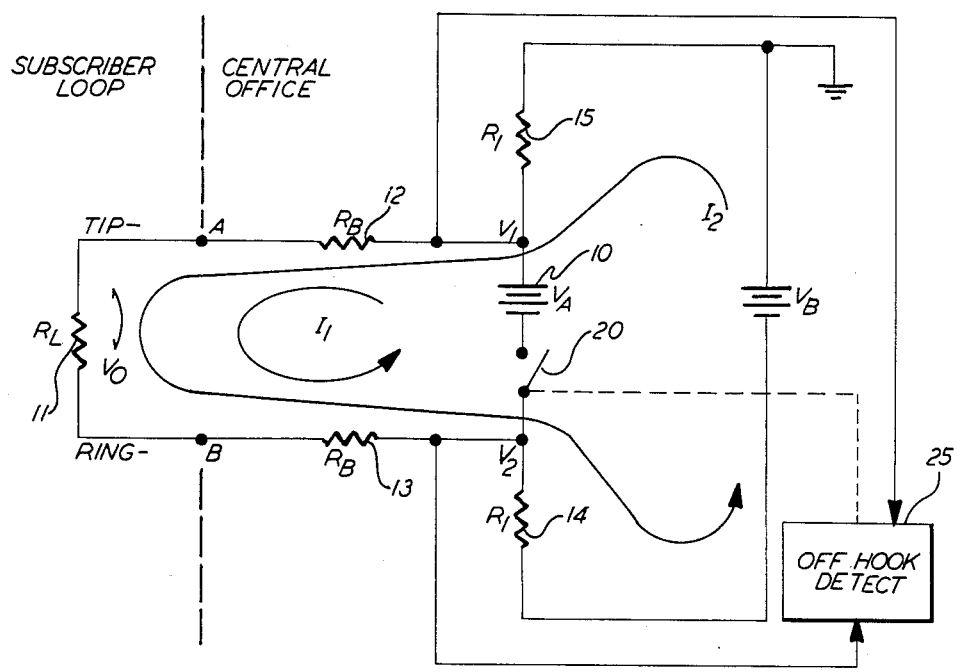
FIG. 1 is a schematic diagram depicting a dual feed arrangement for a line circuit according to this invention.

Referring to FIG. 1, there is shown a schematic diagram of a line circuit utilizing a floating voltage source 10, also designated at $V_A$.

Essentially, a resistor 11 constitutes the line impedance and is conventionally designated as $R_L$. The line impedance of a subscriber line is a function of the length of a subscriber line, and the typical impedance of such lines may vary between a very low value to 2,000 ohms or more.

As seen from FIG. 1, the floating voltage source 10 is coupled to the line terminals, A and B, via equal resistors, 12 and 13, designated as $R_B$. The terminals, A and B, or the respective sides of a subscriber line are also referred to as the ring, or R, side and the tip, or T, side of the line. The central office battery that is conventionally supplied by the switching system is designated as $V_B$ and nominally varies between 48 to 60 volts depending on the particular telephone exchange. The central office battery is supplied to the line circuit terminals via the feed resistors, 14 and 15.

These resistors are selected to be much greater in magnitude than resistors, 12 and 13. In regard to the circuit of FIG. 1, the office battery $V_B$ is the regular central office battery and the floating voltage source 10 may be a switching converter which can be employed for line supervision, line feed, voice amplification and ringing generation.

Such converters have been utilized in line circuits in the past. For example see U.S. Pat. No. 4,315,106 as referenced above where in FIG. 5 thereof a DC/DC converter is shown used in conjunction with a line circuit.

In any event, as will be explained, in the on hook state, the converter 10 is turned off and the off hook supervision is performed solely by the central office battery $V_B$. The turning off of the floating voltage supply $V_A$ is accomplished by means of the switch 20 in series with the $V_A$ supply as shown in FIG. 1.

This technique eliminates the overhead power dissipation and high frequency noise associated with a switching converter in the idle state. As will be explained, after the off hook condition is detected, the switching converter 10 is turned on to then provide the proper line feed current and signal amplification. Based on the circuit shown in FIG. 1, it will be understood that the voltage source $V_A$ can be structured to be an amplifier having a bandwidth and power capability enabling it to handle DC, ringing, voice and remote metering signals. In this manner the amplifier will be a single device capable of handling all the basic driving functions of the line circuit.

As will be further explained, the amplifier has the basic structure of a switching type converter, for example, a fly-back DC/DC converter.

Shown in FIG. 1, there are two voltage indications—namely, $V_1$ and $V_2$, that represent the voltages at the junctions between resistors, 12 and 15, and resistors, 13 and 14, respectively. As indicated, in $R_1$ is much larger than $R_B$ then the voltage $V_1$ is equal to $$V_1 = \tfrac{1}{2}(V_B - V_A)$$

and $$V_2 = \tfrac{1}{2}(V_B + V_A)$$

As can be further ascertained from FIG. 1, when switch 20 is closed then current can flow due to the floating source 10.

When switch 20 is open, as for example in the on hook state, the central office battery performs the line supervision. The resistors, 12 and 13, are selected to be in the range of 25 to 200 ohms, while the resistors $R_1$ are in the range of 5,000 to 50,000 ohms. As indicated, in the off hook state the voltage source 10 is turned off by the equivalent of opening up switch 20 as will be described, in actual implementation, the voltage source 10 is a DC/DC converter or amplifier. Thus, the central office battery $V_B$ is used mainly to detect the initial off hook condition. Due to this fact, the power dissipated in the on hook state of the line is made extremely low as the central office battery does not have to supply talk current. The floating supply 10 is turned on in the off hook state to provide talk current to the loop and the other line driving functions.

As seen in FIG. 1, an off hook detector 25, which can be a conventional circuit, senses the loop current ($I_2$) due to the subscriber line going off hook and, upon detection of this condition, operates switch 20 to place the voltage source 10 ($V_A$) in circuit thereby causing an additional loop current ($I_1$) to flow. This current is used to supply the necessary talk current to the line. As will be described in conjunction with FIG. 3, the off hook detector 25 can be a conventional circuit configuration and senses the current flow in the two-wire line due to the subscriber going off hook and furnished by the central office battery $V_B$.

Based on this arrangement, there is very low power consumption in both the on hook and the off hook condition.

Figure 2:
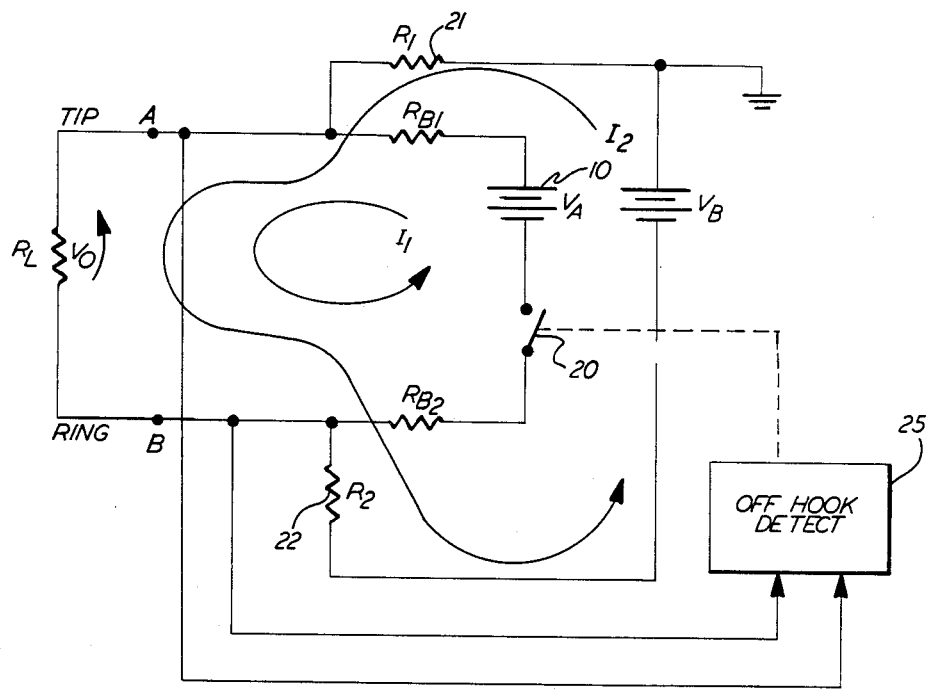
FIG. 2 is a schematic diagram of an alternate embodiment.

Referring to FIG. 2, there is shown a similar circuit as FIG. 1 wherein the central office battery is connected to the line terminals A and B, or the tip and ring terminals, via resistors, $R_1$ and $R_2$, designated at 21 and 22, respectively. These resistors are auxiliary feed resistors for the central office battery. Comparing the circuit of FIG. 1 with the circuit of FIG. 2, it is observed that the floating source 10 is under the control of switch 20 with the major differences between the circuits residing in the position of the central office battery $V_B$. In this embodiment, the off hook detector 25 is based upon a bridge circuit which operates switch 20 upon detection of an off hook condition.

Figure 3:
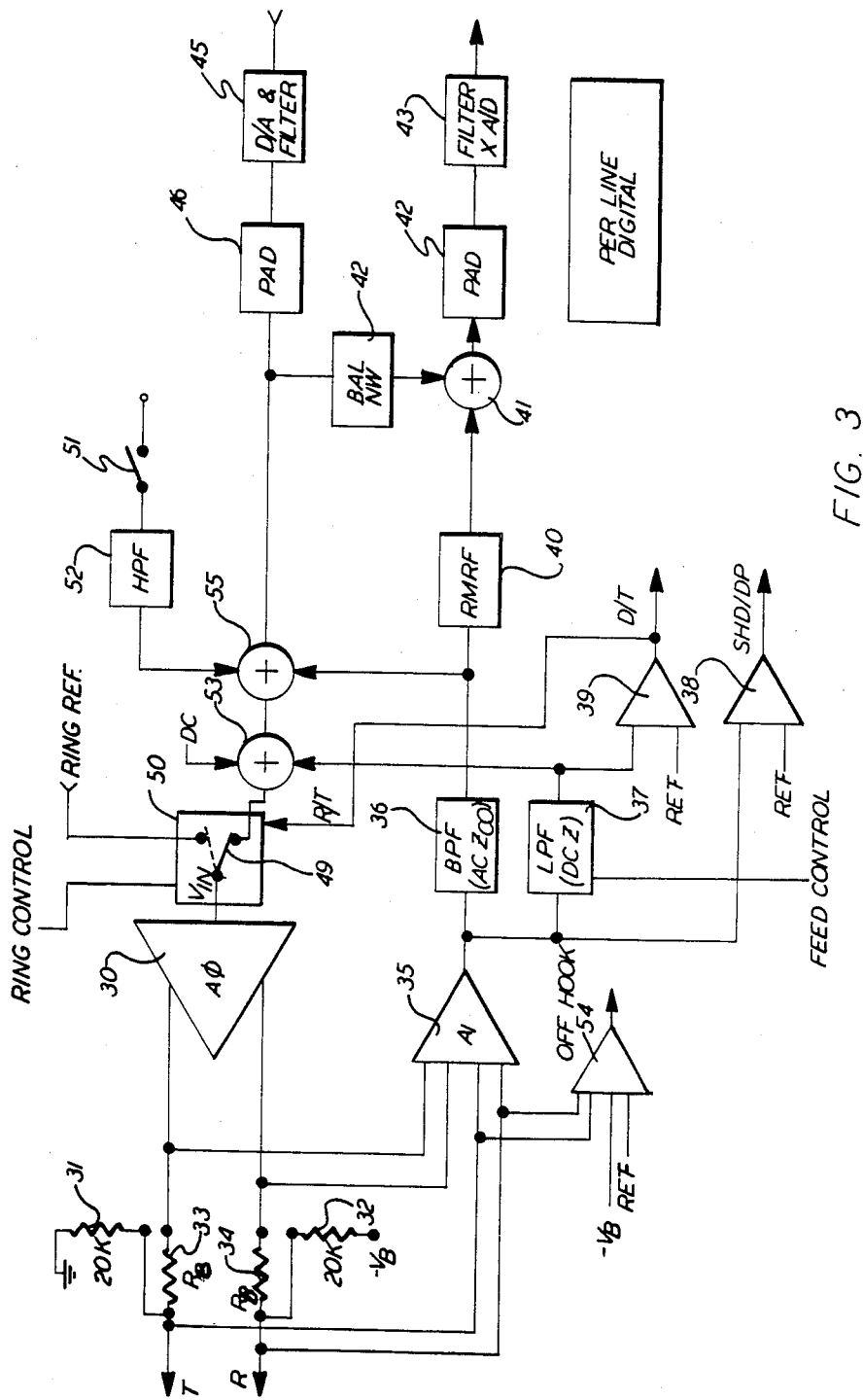
FIG. 3 is a detailed schematic diagram of a line circuit employing an amplifier with a switching converter according to this invention.

Referring to FIG. 3, there is shown a detailed block diagram of the line circuit interface including the auxiliary voltage source as implemented by a high voltage operational amplifier designated by the reference numeral 30.

As seen from FIG. 3, the central office battery $V_B$ is applied to the tip and ring terminals of the line by means of the auxiliary feed resistors, 31 and 32. The auxiliary resistors, 31 and 32, are essentially equivalent to the resistors 21 and 22 shown in FIG. 2. The diagram indicates the value of these resistors as being 20,000 ohms. The feed resistors $R_B$ are also shown in series with the T and R terminals and are designated by the reference numerals, 33 and 34. As seen from FIG. 3, the operational amplifier which, as will be explained, includes a switching converter as the basic building block appears directly across the line. The input to the operational amplifier designated as $V_{IN}$ is coupled to the common arm of a switch 49 that can assume either one of two positions.

In the position shown, the input to the amplifier is coupled to a terminal of the switch as required for normal operation. If switch 49 is operated in the dashed line position, the input to amplifier 30 is coupled to the ringing reference signal which, essentially, consists of an AC component impressed upon a DC level.

As will be explained subsequently, the amplifier 30 is biased on when the subscriber line goes off hook and during ringing. The switch 49 is operated by the ring logic 50 which is a logic circuit that enables switch 49 to be energized, in the dashed position, when the ring control signal is present and when the subscriber has not yet answered. At the same time amplifier 30 is energized. Hence amplifier 30 will be energized both in the off hook condition and in the ringing condition to allow the amplifier to generate the ringing signals.

When the subscriber answers the ringing, the ring detector 39 is tripped, signalling the ring logic 50 to reinstate switch 49 into the solid line position to disable the ringing generation and enable the normal line feed functions. At this stage, the switch hook detector 38 maintains the bias on amplifier 30.

The circuit of FIG. 3 is a block diagram of a typical line circuit, many other examples of which exist. For example, U.S. Pat. No. 4,254,305 entitled CURRENT LIMITED SUBSCRIBER LINEFEED CIRCUIT issued on Mar. 3, 1981 to Robert Treiber and assigned to the assignee hereof.

A brief description of the line circuit operation is as follows.

The module 35 designated as $A_1$ essentially operates as a line current sensor. An example of such a circuit is given in the above-mentioned U.S. Pat. No. 4,254,305. The amplifier circuit 35 monitors the line current flowing in the subscriber line to determine when the subscriber has gone off hook. Hence the line current sensor circuit senses the voltage output across the lines by comparing the voltage across the tip and ring lines with the voltage across the operational amplifier 30. In this manner the circuit $A_1$ produces a voltage which is proportional to the line current.

The output of the line current sensor 35 is applied to a band pass filter (BPF) 36, to a low pass filter (LPF) 37 and to an input terminal of a switch hook and dial pulse detector (SHD/DP) 38.

The detector 38 provides a signal to the switching system when the subscriber goes off hook and further provides a signal indicative of dial pulses generated by dialing. In an ordinary rotary dialer, a dial pulse is generated by opening and closing a switch in series with the switch hook and the detector 38 will follow such transitions to provide a dial pulse output.

The output of the low pass filter 37 is coupled to one input terminal of a ring/trip detector 39. Essentially, ring/trip detectors are known and function to send a signal to the central office when a subscriber has answered a ringing signal and to disable the ringing generation by controlling switch 49. The central office will turn off the ring control signal to that line to prevent regeneration of the ringing signal at the call termination. Both detectors, 38 and 39 have another input terminal to which is applied a reference voltage that essentially sets a threshold for detector operation.

As an example, see U.S. Pat. No. 4,161,633 entitled SUBSCRIBER LINE/TRUNK CIRCUIT issued July 17, 1979 to R. Treiber and assigned to the assignee hereof. Therein typical line circuits are shown as well as detectors, 38 and 39. The output of the bandpass filter 36 is coupled to a module 40 designated as RMRF, i.e. a remote metering reference filter. During a metering operation, a high frequency signal is applied to the line circuit for testing purposes.

The output of module 40 is coupled to a summer 41 that essentially receives an input from a balancing network 42. The balancing network operates to compensate or equalize the line circuit for differences between the transmit and receive paths to maintain a balanced circuit structure for various signal conditions.

The output from summer 41 is coupled to a pad circuit 42. A pad circuit is a known circuit component and is used to provide impedance matching for optimum signal transfer. The output of the pad 42 is coupled to module 43 which module 43 is a filter and an analog-to-digital converter.

In modern telephone systems, digital signals are transmitted through the switching system to the remote subscriber. Hence, in such systems the voice signals generated by the subscriber as modulating the talk battery or, in the case of this application, by modulating the floating voltage source, produces analog voice signals. The analog voice signals are converted to digital signals by the analog-to-digital converter 43.

Examples of typical analog-to-digital converters can be had by referring to U.S. Pat. No. 4,270,027 entitled TELEPHONE SUBSCRIBER LINE UNIT WITH SIGMA-DELTA DIGITAL-TO-ANALOG CONVERTER issued on May 26, 1981 to B. P. Agrawal et al. and assigned to the assignee hereof.

Accordingly, on the receive side of the line circuit there is shown a digital-to-analog converter and filter 45. The functions of module 45 is to receive the digital signals and convert them to analog signals for transmission to the subscriber line circuit. The output of module 45 is coupled via a pad 46 having an output coupled to the input of the balancing network 42 and an output coupled to one input of a summing circuit 55. The summing circuit 55 receives the analog signals for transmission to the line circuit and can further receive at its other input a remote metering signal that is transmitted to the line circuit upon closure of switch 51 via the high pass filter 52. In the remote metering mode, a signal such as a 12 to 16 KHz signal is transmitted to the line circuit. The RMRF filter 40 prevents this signal from being returned by the line circuit during the remote metering procedure. The summing circuit 55 also receives an input from the band pass filter (BPF) 36. This input provides a programmable central office impedance for the audio signal.

The output from the summary 55 is applied to one input of a further summer 53. Summer 53 also receives an input from the low pass filter 37. And as a third input it receives a DC reference signal. The summer 53 provides an audio signal for the line circuit that has a suitable DC level for biasing purposes. The DC bias can be selectable by an external feed control signal.

As indicated above, the operational amplifier 30 is capable of handling all the basic driving functions of the line circuit. These driving functions, as indicated, include supplying DC to the line circuit in terms of the floating DC level $V_A$, to supply ringing, voice amplification and remote metering.

Figure 4:
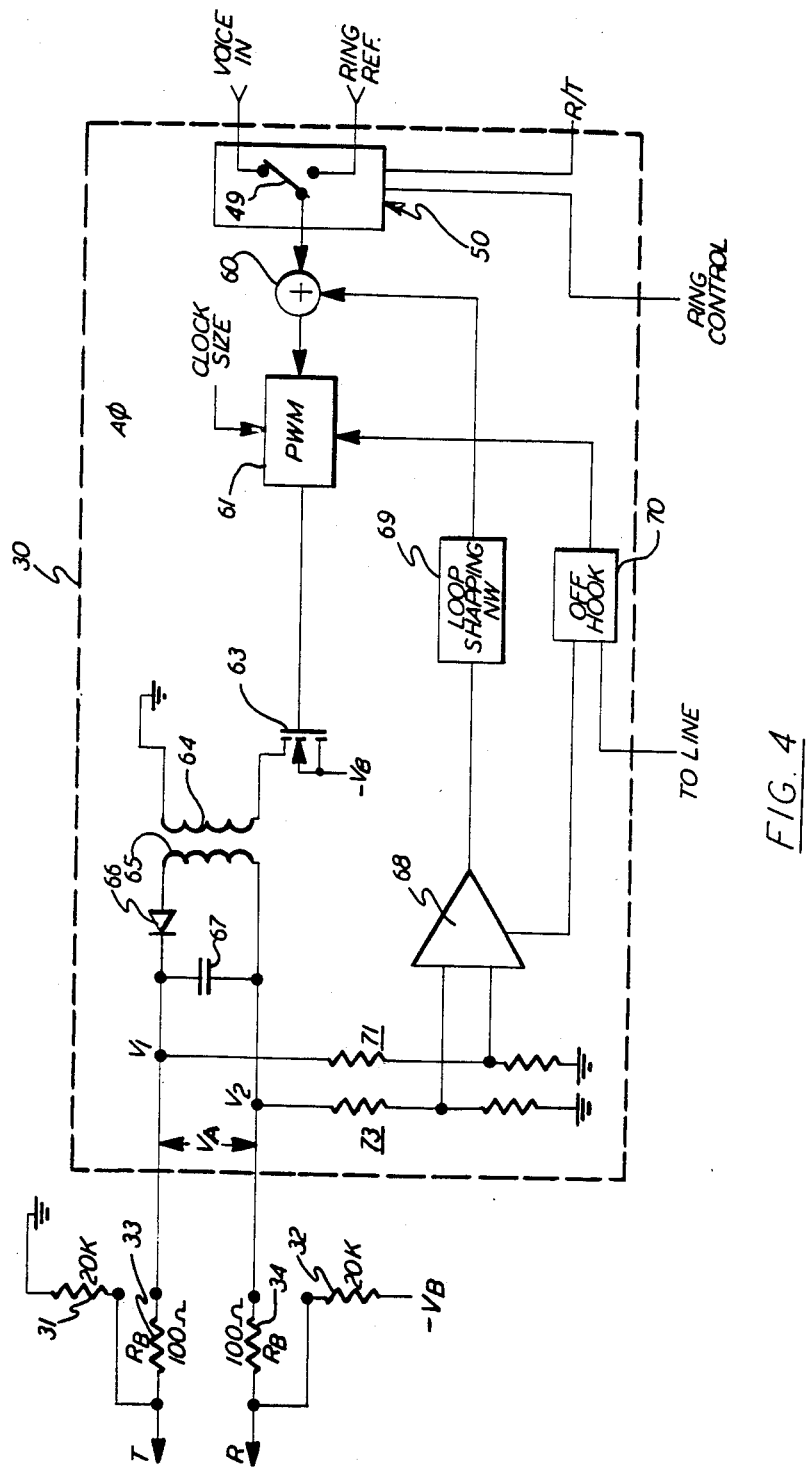
FIG. 4 is a schematic diagram of the amplifier employed in the line circuit.

Referring to FIG. 4, there is shown a schematic diagram of the operational amplifier 30 as depicted in FIG. 3. The same reference numerals have been employed to designate the same components such as the feed resistors and so on. Essentially, as indicated, the operational amplifier 30 employs a switching converter. As seen in FIG. 4, there are two inputs to the amplifier selectable via switch 49 controlled by the ring logic 50. The two inputs are the ring reference for ringing generation, the voice input for normal line conditions. The output of switch 49 is fed to an input terminal of a summer 60. The summer 60 has an output terminal coupled to the input of a pulse width modulator 61. A clock signal for the pulse width modulator (PWM) is applied to the other input terminal. The output of the PWM 61 is applied to the gate electrode of a field effect transistor 63.

The field effect transistor has its source to drain path in series with the primary of a power transformer 64 which receives at one terminal a bias potential designated as $-V_B$ (central office battery). The secondary 65 of the power transformer is coupled through diode 66 to a filter capacitor 67 to produce the voltage $V_A$ across the line circuit. The output voltage across capacitor 67 is monitored by means of a differential amplifier 68. The differential amplifier 68 has two input terminals each coupled respectively to an associated voltage divider, 73 and 71, to monitor the voltage $V_A$ and thus provide an error voltage at the output based on the difference between the voltages, $V_1$ and $V_2$, i.e. those voltages indicated in FIG. 1.

The output of the differential amplifier 68 is applied through a typical feedback network which essentially provides a shaped signal to be applied to the adder 60 which will specify the operating characteristics of the line circuit. For examples of a particular amplifier configuration, reference is made to a co-pending application entitled A WIDEBAND HIGH VOLTAGE AMPLIFIER FOR TELEPHONE EXCHANGE SUBSCRIBER LINE INTERFACE UTILIZING LOW VOLTAGE CIRCUITRY filed on Apr. 10, 1984 as Ser. No. 598,650 by R. C. W. Chea, Jr. and assigned to the assignee hereof.

As seen from FIG. 4, the amplifier depicted including the switching converter supplies an auxiliary voltage to the line circuit. This auxiliary voltage is developed across the output capacitor 67 and furnishes the talk current for the line circuit. The amplifier, as above indicated, is actuated by means of off hook detector 70. The off hook detector 70 detects the off hook conditions by means of a bridge circuit across the line and provides an output when the line goes off hook.

In this manner, the off hook detector 70 and associated circuitry supplies a control signal when the subscriber line goes off hook. This signal applies operating bias to the various modules included in the amplifier configuration. Thus the circuit described above operates only when the subscriber line goes off hook with the auxiliary voltage $V_A$ supplying the entire driving requirements for the line circuit during off hook operation. This control signal can also be provided by external control to enforce conditions such as line-lock-out and prevent the amplifier from being biased on even during off-hook conditions.

Consequently, since the amplifier is biased on only during off hook, the amplifier does not dissipate any power in the on hook condition. However, when ringing is required from the line circuit, the ring control signal is detected by the ring logic 50 of FIG. 3. The ring logic 50 operates to bias the amplifier in the on condition during the generation of ringing. Thus, as shown in FIG. 4, the output of the ring logic can be applied to the off hook detector 70 to turn the detector on during the detection of the ring control signal and thus bias the amplifier on for ringing generation.

As indicated, when ringing generation is required, the switch 49, associated with amplifier 30, is operated in the dashed line position to apply the ring reference to the input adder 60. The amplifier then responds to the ring reference signal and impresses the ringing voltage across the line via the switching converter.

As depicted in FIG. 3, there has been shown a front end circuit configuration for a line circuit whereby the line circuit includes an amplifier employing a switching converter for developing an auxiliary voltage across the line circuit upon detection of an off hook condition. The amplifier is capable of handling all basic line driving functions such as ringing, voice and the application of DC current to the line circuit as well as the handling of remote metering signals. In this manner one can eliminate all requirements for high voltage integrated circuits in a typical line circuit structure.

What is claimed is:

1. An interface circuit for a subscriber line circuit for use in a telephone exchange, said line circuit having a two wire line with each wire coupled to a central office battery via a separate feed resistor; said interface circuit comprising:

a controllable amplifier means including a floating switching converter having, as an integral part thereof, a capacitor coupled across said two wire line and operative to supply an auxiliary voltage to said line;

means, coupled to said line to monitor the voltage across said capacitor, for providing a feedback control signal for said amplifier means;

a first adder having one output thereof coupled to said converter for controlling said auxiliary voltage across said capacitor, a first input of said adder being coupled to receive said feedback control signal and a second input thereof being adapted to receive input signals for said line circuit;

off hook detector means operative to provide an output signal when said subscriber line goes off hook for controlling said amplifier means to cause said amplifier means to operate during said off hook condition; and ring control logic detection means coupled to said amplifier means for detecting the presence of a ring control signal applied to said line and for providing an output for controlling said amplifier means to generate a ringing signal during the presence of said ring control signal whereby said amplifier means, as controlled, is operative only during the presence of a ring control signal and during an off hook condition of said line.

2. The circuit according to claim 1 wherein said converter further includes a power transformer having a primary and a secondary winding, one terminal of said secondary winding being connected to a terminal of said capacitor via a unilateral current conducting device, and another terminal of said secondary winding being connected to the other terminal of said capacitor, and having a terminal of said primary winding connected through a selectable switching means to a point of reference potential.

3. The circuit according to claim 2 wherein the output of said adder is coupled to the input of a pulse width modulator having a clocked input for providing at an output a pulse width modulated signal in accordance with an input signal applied to said adder and means coupling said output of said pulse width modulator to said selectable switching means.

4. The circuit according to claim 1, wherein said second input of said adder is coupled to a controllable switching means, with said output of said ring control logic means operative to control said switching means to place said switching means in a first state to receive a ring reference signal during the generation of ringing.

5. The circuit according to claim 1 further including a line current detector coupled across said line and operative to provide at an output a signal proportional to the current flow in said line.

6. The circuit according to claim 5 further including a bandpass amplifier having an input coupled to the output of said line current detector with the output of said bandpass filter coupled to an input of an adder circuit.

7. The circuit according to claim 5 further including a switch hook detector having an input coupled to said output of said line current detector, to provide an output indicative of an off hook condition.

8. The circuit according to claim 1 further including a digital to analog converter having an output coupled to the second input of said adder for applying digital input signals thereto.

9. The circuit according to claim 8 further including a remote metering signal adder having one input coupled to the output of said digital to analog converter and a second input coupled to a remote metering signal source, with the output of said signal adder coupled to the second input of said first adder adapted to receive input signals.

10. The circuit according to claim 5 further including a low pass filter having an input coupled to the output of said line current detector with the output of said low pass filter coupled to the input of a ring trip detector for providing at an output a level indicative of said line current and responsive to an off hook condition during the ringing generation for disabling the ringing generation and providing line feed driving conditions, said output of said low pass filter being further coupled to an adder and providing line feed signals.

* * * * *